United States Patent
Caponetti et al.

(10) Patent No.: US 10,662,924 B2
(45) Date of Patent: May 26, 2020

(54) ROTOR BLADE CONTROL FOR HIGH WINDS

(71) Applicant: VESTAS WIND SYSTEMS A/S, Aarhus N (DK)

(72) Inventors: Fabio Caponetti, Aarhus C (DK); Ian Couchman, Horley (GB); Thomas Krüger, Tilst (DK); Ali Zaib, Aalborg (DK); Carsten Nørlund Thomsen, Langå (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 15 days.

(21) Appl. No.: 15/037,902

(22) PCT Filed: Nov. 19, 2014

(86) PCT No.: PCT/DK2014/050393
§ 371 (c)(1),
(2) Date: May 19, 2016

(87) PCT Pub. No.: WO2015/074664
PCT Pub. Date: May 28, 2015

(65) Prior Publication Data
US 2016/0305402 A1    Oct. 20, 2016

(30) Foreign Application Priority Data
Nov. 21, 2013  (DK) ................................ 2013 70714

(51) Int. Cl.
*F03D 9/00* (2016.01)
*H02P 9/04* (2006.01)
(Continued)

(52) U.S. Cl.
CPC ......... *F03D 7/0264* (2013.01); *F03D 7/0224* (2013.01); *F03D 9/255* (2017.02);
(Continued)

(58) Field of Classification Search
CPC ........ F03D 7/0264; F03D 7/0224; F03D 9/25; F03D 9/255; H02J 11/00; H02K 7/183
See application file for complete search history.

(56) References Cited

U.S. PATENT DOCUMENTS 7,898,100 B2    3/2011  Andersen et al.
8,096,762 B2 *  1/2012  Risager ................. F03D 7/0224
                                                      416/1
(Continued)

FOREIGN PATENT DOCUMENTS

DE    19532409 A1    3/1997
EP    2150699 B1 * 10/2010 ........... F03D 7/0224
(Continued)

OTHER PUBLICATIONS

International Search Report for PCT/DK2014/050393, dated Feb. 23, 2015.
Danish Search Report for PA 2013 70714, dated Aug. 14, 2014.

*Primary Examiner* — Tulsidas C Patel
*Assistant Examiner* — Thomas K Quigley
(74) *Attorney, Agent, or Firm* — Patterson + Sheridan, LLP

(57) ABSTRACT

The invention relates to a control apparatus and method for controlling the rotor blades of a wind turbine, and in particular to controlling the rotor blades during an extreme wind event. An extended mode of operation of the wind turbine rotor beyond the cut-out wind speed is provided. In the extended mode of operation, the pitch of the wind turbine blades is actively controlled so that the rotor and the generator idle at a designated rotational speed. The rotational speed may be relatively high, say 15 to 20% of the nominal speed, compared with minimal speeds experienced by purely feathered wind turbine blades, and may be further controlled as a function of the incident wind speed. Output power control in the extended mode may be zero but is preferably a low, but non-zero value. The output power so produced may then be used as an auxiliary power source for controlling the wind turbine in situations where the utility grid fails.

19 Claims, 4 Drawing Sheets

(51) Int. Cl.
   *F03D 7/02*   (2006.01)
   *F03D 9/25*   (2016.01)
   *H02J 11/00*  (2006.01)
   *H02K 7/18*   (2006.01)

(52) U.S. Cl.
   CPC .............. *H02J 11/00* (2013.01); *H02K 7/183* (2013.01); *F05B 2270/3201* (2013.01); *F05B 2270/322* (2013.01)

(56) References Cited

U.S. PATENT DOCUMENTS

| | | | | |
|---|---|---|---|---|
| 9,062,653 B2* | 6/2015 | Brath | ................... | F03D 7/0264 |
| 9,140,239 B2* | 9/2015 | Dalsgaard | ............. | F03D 7/0264 |
| 9,217,416 B2* | 12/2015 | Spruce | .................. | F03D 7/0224 |
| 2008/0179886 A1* | 7/2008 | Rebsdorf | ................. | F03D 7/02 290/44 |
| 2009/0218818 A1* | 9/2009 | Cardinal | ............... | F03D 7/0284 290/44 |
| 2010/0283245 A1* | 11/2010 | Gjerlov | ................. | F03D 7/0224 290/44 |
| 2011/0211951 A1 | 9/2011 | Kooijman et al. | | |
| 2012/0061962 A1 | 3/2012 | Nagasaki | | |
| 2012/0211982 A1* | 8/2012 | Tanabe | .................. | F03D 7/0272 290/44 |
| 2013/0134711 A1* | 5/2013 | Spruce | .................. | F03D 7/0224 290/44 |
| 2013/0161950 A1 | 6/2013 | Hsiao et al. | | |
| 2014/0110941 A1* | 4/2014 | Kjær | .................... | F03D 7/0264 290/44 |

FOREIGN PATENT DOCUMENTS

| | | | | |
|---|---|---|---|---|
| EP | 2447530 A2 | 5/2012 | | |
| GB | 2479415 A | 10/2011 | | |
| WO | WO 2012025121 A2 * | 3/2012 | .......... | F03D 7/0264 |
| WO | 2012/163359 A1 | 12/2012 | | |

* cited by examiner

ROTOR BLADE CONTROL FOR HIGH WINDS

The invention relates a control apparatus and method for controlling the rotor blades of a wind turbine, and in particular to controlling the rotor blades during high wind or extreme loading events.

Known pitch regulated wind turbines operate in a number of different modes dependent on parameters such as the available power and also the incident wind speed. As far as power production is concerned, in normal conditions a wind turbine will operate in one of two modes known as either partial or full load operation. In partial load operation, the generator speed is typically controlled so that the efficiency of the turbine is maximised. A partial load controller controls the rotational speed of the turbine by selecting the proper counter torque, and a pitch controller controls the angle of attack of the wind turbine blades so that they are angled into the wind and ensure the maximum efficiency and power coefficient. This tends to accelerate the rotor and causes the power produced to increase towards its maximum or rated power level.

In full load operation, when the generator of the wind turbine has reached its maximum or rated power output, a full load controller controls the angle of attack of the blades so that the blades are turned fully or partially out of the wind. In this situation, the blades are said to be feathered as they no longer interact with the wind in the most aerodynamic way and allow some of the kinetic energy from the wind to escape. As a result, not all of the kinetic energy available is turned into a torque on the rotor and a corresponding power output at the generator, and the rotor blades can be prevented from turning too fast, overloading the wind turbine generator or grid, and exerting damaging loads on the drive train or tower.

A number of control mechanisms exist for controlling the operation of the wind turbine rotor and generator in dependence on the wind speed. For example, below a minimum wind speed, called the cut-in wind speed, the wind turbine cannot operate efficiently to produce power, and is either braked or allowed to idle. Additionally, above a maximum wind speed, called the cut-out wind speed, the wind turbine will usually be shut down to ensure safety.

At shut down, the wind turbine generator is usually electrically disconnected from the grid, and controlled so that no power is output from the generator. With the wind turbine idling or at standstill, the nacelle of the wind turbine will often be turned into the direction of the oncoming wind using a yaw controller and the wind turbine blades themselves be feathered against the oncoming wind so that the wind is spilled. Turning the nacelle into the wind ensures that the wind turbine blades respond to the oncoming wind in a predictable way and leads to a minimisation of loads. The wind turbine rotor may also be actively braked so that the rotor cannot turn, or it may be allowed to turn freely under the influence of the incoming wind.

As long as the wind turbine rotor is not actively braked, then in the region of operation above the cut-out wind speed, the wind turbine generator is often said to be idling. Idling is when the rotor and generator are able to turn but are not actively connected to control systems or the grid, and typically occurs at minimal rotational speeds.

Shutdown of a wind turbine generator in extreme wind or failure conditions is described for example in WO2007/086930, in which a braking torque is applied to the rotor to bring it to a standstill.

In the feathered position, however, owing to the large surface area of the blade that extends against the direction of wind flow, the wind turbine blades may still experience significant forces from the wind, in particular in cases of high wind speed, or rapid changes in wind speed or wind direction, in other words wind gusts. A particular problem is oscillations induced in the blade structure or tower as a result of the incident wind or from rotation of the generator. Edgewise oscillations for example refer to oscillations in the length wise direction of the blade, that is periodic movements of the blade tip with respect to the blade root, and have serious implications for the rotor and drive train if left unchecked.

The applicant's earlier application WO2009/068035 for example describes a situation in which when in an idling situation, the loads on the wind turbine blades are controlled to remain within design tolerances and safety margins. In particular, the controller measures the loads experienced by respective wind turbine blades, and controls the pitch of the blades to offset or reduce the load.

The problem of managing loads on the wind turbine generator becomes even more significant during high wind or extreme loading events. Extreme wind events are events in which the wind reaches a very high speed, or in which the wind is subject to rapid changes in direction, such as turbulent or storm like conditions for example. Extreme wind events may include winds having speeds of over 50 m/s or 70 m/s for example, while high wind speeds may refer to speeds between 25 m/s and 50 m/s.

Many load reduction systems rely on the operation of pitch actuators and yaw drives to correctly orientate the wind turbine and the wind turbine blades in the oncoming wind stream. However, such control systems require power to be available, and while such power can be drawn from the output to the utility grid, in extreme wind conditions it is possible that the utility grid will have failed and that the necessary power will not be available. An auxiliary power supply can provide power for such situations but comes at additional cost and adds complexity to the design of the wind generator and wind park.

In view of the prior art systems, we have appreciated that it would be desirable to provided a control system for a wind turbine that effectively controls loads in high or extreme wind events. In this regard, we have also appreciated that a control system that can be used in extreme wind events to mitigate loads can also be used more generally in extreme loading events.

SUMMARY OF THE INVENTION

According to a first aspect of the invention there is provided a method of operating a wind turbine generator having wind turbine blades with active pitch control, the method comprising: determining an operating condition at the wind turbine generator indicative of an extreme wind event or an extreme loading event; once a determination of an extreme wind event or extreme loading event is made, maintaining the generator speed at a non-zero value, lower than the rated value, in a region above the cut-out wind speed (v_off); and operating one or more blade pitch actuators to control the rotation of the wind turbine blades.

By controlling the generator speed above the cut_off wind speed so that the generator has a low but non-zero rotational speed, and by using active pitch control, the loads experienced by the wind turbine generator and drive train can be kept under control and limited to values that are both within the design load envelope for the wind turbine and that are lower than the case where the wind turbine is brought to a standstill. During operation of the wind turbine with the non-zero generator speed, but with active pitch control, the wind turbine may be considered to be operating in safe idling mode.

The reduction in generator speed from the rated value to the non zero value indicates a possible reduction to 60% or less than the rated value, 50% or less, 40% or less, 35% or less, or 25% or less.

The operating condition may be one or more of, the wind speed, the wind direction, a detection of turbulence, a load on a rotor blade, the load on the main bearing, and tilt-yaw moments. Thus, the operating condition may directly indicate an extreme wind condition, such as in measurements of wind variables, or may indirectly indicate such a condition, such as high loads experienced on the wind turbine blades or other components. Where the operating condition is a load, it is possible also that the safe idling mode will be engaged before the wind speed exceeds the cut-out wind speed. In this mode, the generator speed is reduced from the rated value to the non-zero value while ever the extreme loading condition remains.

The method of claim 1 or 2, wherein when a detection of an extreme wind event or extreme loading event is made, one or more controllers are operated to control the operation of the wind turbine, the controllers including, a pitch controller, a tilt yaw controller, active tower damping controller, and a drive train damping controller. The operation of the controllers provides additional stability in the operation of the wind turbine rotor during the extreme event.

In one embodiment, the predetermined value for the generator speed is independent of the wind speed. The generator speed control function in this scenario is essentially a straight horizontal line expressing a constant value. In alternative embodiments, the predetermined value for the generator speed decreases continuously with increasing wind speed, or the predetermined value for the generator speed decreases discontinuously with increasing wind speed, featuring steps or jumps which omit predetermined values of the generator speed. In the first of these two scenarios, the generator speed control function may be a linear function like a straight line with negative gradient, or a non linear function like a curve tending to a value such as zero. In the latter scenario, the control function may be a step function for example.

In one embodiment, the predetermined value for the generator speed is 15 to 20% of the rated generator speed, optionally 10 to 25%. This range of values has been found sufficiently high in magnitude to allow the pitch control actuators to operate efficiently in reducing the loads on the drive train, and low enough so that the rotation of the rotor and generator does not contribute unduly to the loading on the drive train and the tower. In embodiments, the lower limit of the range may also be 5%.

The method may also comprise, in a region immediately below the cut-out wind speed, operating one or more blade pitch actuators and maintaining the generator speed at a predetermined value for a given wind speed, the predetermined value for the generator speed decreasing with increasing wind speed. Thus, the rated generator speed and power output may be partially derated in advance of the cut-out wind speed.

Additionally, the method may comprise detecting a cut_out wind speed (v_off) for the wind turbine and electrically disconnecting the wind turbine generator from the utility grid. Alternatively, the wind turbine may under the new control regime remain connected to the grid.

The method may additional comprise, in a region above the cut-out wind speed (v_off), controlling the generator to have a non-zero power output, and diverting the output power to provide auxiliary power for the wind turbine control systems. This allows the wind turbine to be self sustaining in the event that there is a grid failure, without the need to provide a dedicated auxiliary source of power such as a diesel generator or battery storage system.

In one embodiment, the method comprises operating a yaw drive to angle the rotor of the wind turbine generator to face in the oncoming wind direction. Yaw alignment serves to reduce loads that may arise if the rotor is not aligned correctly into the oncoming wind.

For example, the blades may not be correctly feathered relative to the incoming flow resulting in an increased angled of attack and undesirable aerodynamic forces developing.

However, the method may additionally or alternatively comprise detecting a yaw error and if the yaw error is greater than a threshold, setting the generator speed to zero and shutting down the wind turbine generator. This allows the extended mode of operation to run even where the yaw drive function is not available, or where the wind direction is changing too rapidly for the yaw drive to adjust.

The invention comprises a wind turbine generator with a correspondingly programmed controller, and a computer program product for operating on a wind turbine controller.

BRIEF DESCRIPTION OF THE DRAWINGS

Example embodiments of the invention will now be described with reference to the drawings in which.

DETAILED DESCRIPTION

Figure 1:
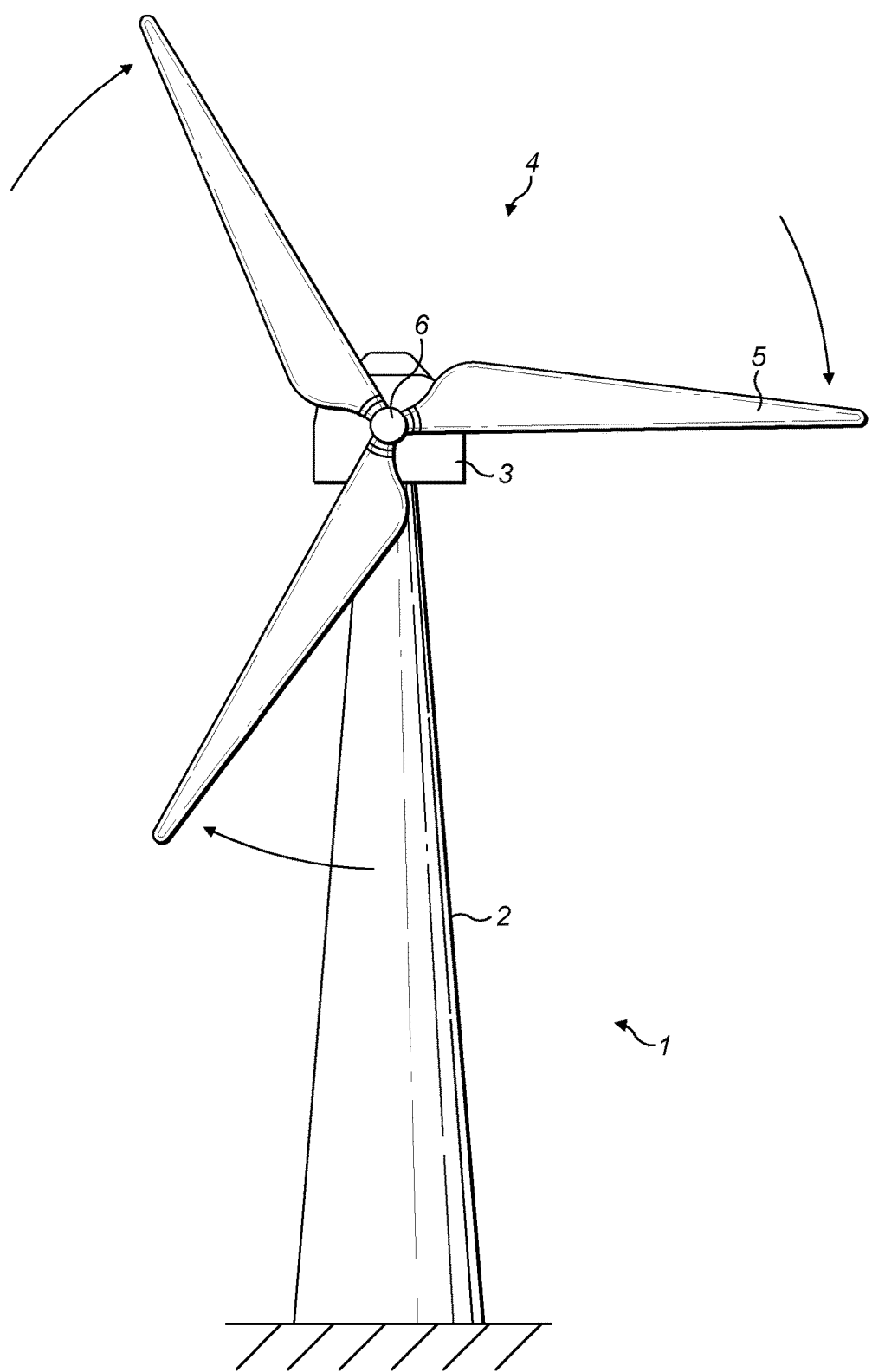
FIG. 1 is a schematic illustration of a wind turbine.

In an example embodiment of the invention, a control apparatus and method is provided for controlling the rotational speed of the wind turbine generator, in particular during an extreme wind or extreme loading event. The new control strategy extends the active operation of the wind turbine rotor blades to a region beyond the existing cut-out wind speed into a safe idling mode.

The new control strategy may assume that power for the wind turbine control system is available either from the grid, or from an auxiliary power source, such as a separate dedicated generator or the wind turbine itself. In the extended mode of operation, the wind turbine is therefore yawed into the wind, and the pitch of the wind turbine blades is controlled so that the rotor and generator idle at a designated rotational speed. Preferably, the rotational speed maintained by the active pitch control is relatively high in comparison to the minimal speeds that resulting naturally from the idling of the unbraked rotor disconnected from the grid. In particular, the generator speed is preferably controlled so that it lies the range of 15 to 20% (optionally 10 to 25%) of the rotational speed for normal operational conditions. In alternative embodiments, other speeds may also be used as desired. Controlling the generator in the safe idling mode so that it has a low but non-zero rotational speed allows the wind turbine to be safely controlled using a number of control mechanisms, such as pitch control, Tilt and Yaw Control, Extended Tilt and Yaw Control, Active Tower Damping, and Drive Train Damping.

The use of such control mechanisms to control wind turbine operation in normal operation is known. However in the present case, we have appreciated that such controllers can be used in an extended region (in which the wind turbine would normally be deactivated for safety reasons) to thereby maintain safe operation of the wind turbine. The controllers may require adapting for use in the extended region to reflect different operating conditions compared to the usual case.

Furthermore, the designated wind speed for idling the wind turbine rotor may be calculated as a function of the determined incident wind speed. Operation of the wind turbine at low idling speeds using active pitch and yaw control has been found to keep the loads on the wind turbine and tower within suitable tolerances.

Output power control of the wind turbine in the extended mode of operation may also be set to zero as in the prior art. However, the rated power production is preferably a low, but non-zero value, allowing the power output in the extended mode of operation to be used as a source of auxiliary power source for the wind turbine control systems. This avoids any need to rely on the grid power or a separate power generator for auxiliary power. Indeed in extreme wind conditions, the grid may be unavailable. It also provides counter torque on the rotor to balance the aerodynamic torque resulting from the incident wind.

An example embodiment will now be described in more detail and with reference to FIGS. 1 to 4 of the drawings.

FIG. 1 illustrates a wind turbine 1, comprising a wind turbine tower 2 on which a wind turbine nacelle 3 is mounted. A wind turbine rotor 4 comprising at least one wind turbine blade 5 is mounted on a hub 6. The hub 6 is connected to the nacelle 3 through a low speed shaft (not shown) extending from the nacelle front. The wind turbine illustrated in FIG. 1 may be a small model intended for domestic or light utility usage, or may be a large model, such as those that are suitable for use in large scale electricity generation on a wind park or power production facility. In the latter case, the diameter of the rotor may be as large as 120 meters or more.

Figure 2:
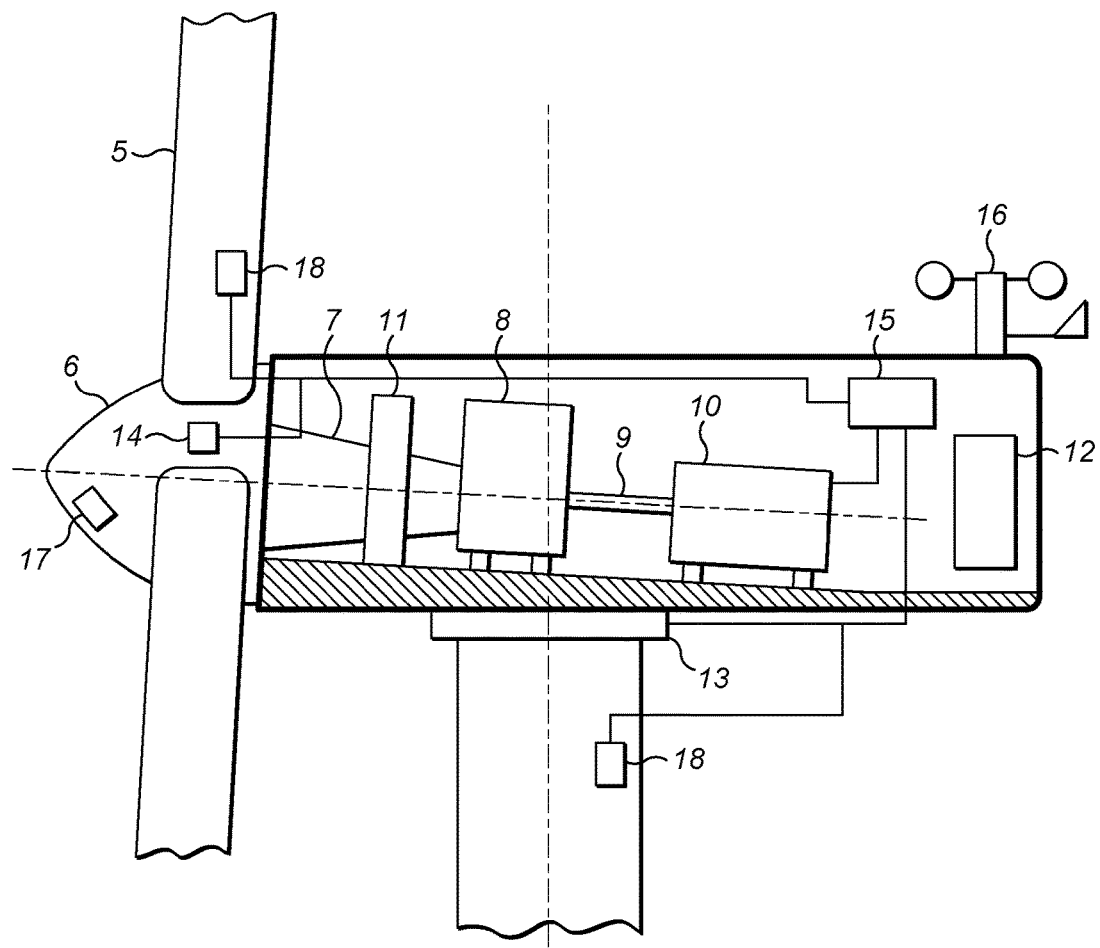
FIG. 2 is a schematic illustration of a wind turbine controller.

FIG. 2 illustrates a schematic view of an example of an interior of the nacelle 3. A main drive shaft 7, supported by a main bearing 11 extends from the hub 6 and is received in a gear box 8. A secondary shaft 9 extends from the gear box 8 and into the generator 10. The nacelle 3 also comprises a power converter/transformer 12, as well as ancillary apparatus, such as control devices, sensors, heating and lighting units, hydraulic systems, cooling systems and so on.

The nacelle 3 is mounted on the wind turbine tower 2 by means of a yaw drive 13, which allows the azimuthal orientation of the nacelle with respect to the incident wind direction, the up-wind direction, to be adjusted, and in particular for the wind turbine rotor 4 to be angled into the wind. One or more pitch control actuators 14, such as a pneumatic or electrical pitch control actuators, are also mounted in the hub 6 to engage with the root sections of the wind turbine blades, for controlling the orientation of the wind turbine blades about their longitudinal axis.

Nacelle 3 also comprises controller 15 connected to generator 10, yaw drive 13, and one or more pitch actuator 14 by suitable control lines. The controller may also be connected to one or more sensor devices such as anemometer and/or wind vane 16 for determining wind speed and/or wind direction at the wind turbine. Alternatively, wind speed and direction may be measured elsewhere, such as on a meteorological mast or other wind turbine and an estimated value transmitted to the wind turbine controller 15. An optional ranged wind speed measurement device such as a LIDAR, RADAR or SONAR device 17 may also be housed in hub 6 or on the nacelle 3 for detecting the wind speed and wind conditions upwind of the wind turbine. In alternative embodiments, the wind speed and/or direction may be estimated from the generator speed, the power produced by the wind turbine, and other suitable turbine characteristics. Lastly, the rotor blades and wind turbine tower may comprises one or more load sensors for determining an operational load on the wind turbine component and for transmitting this via suitable control lines to the controller 15.

Additional sensors may detect other conditions affecting the wind turbine rotor and rotor blades, such as temperature, air turbulence, vibration, for example.

In practice, the controller 15 is implemented as a dedicated processor with access to control algorithms embodied in software or hardware, that receives sensor inputs and outputs control signal on suitable control lines or data bus. Specifically, the controller receives control signals indicating the measured or estimated wind speed at the wind turbine generator, and sets at least a power reference control signal to set the operating conditions of the generator 10, and pitch reference and yaw reference control signals to control the wind turbine blade pitch actuators and the yaw angle for the rotor 6. The controller is usually typically connected to a network, such as the SCADA (supervisory control and data acquisition network).

Figure 3A:
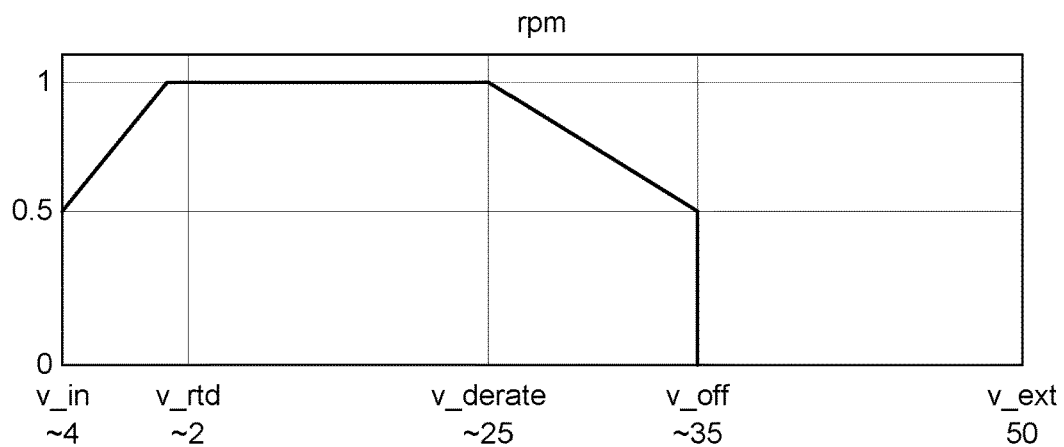
FIG. 3 is a schematic illustration of a generator control algorithm according to an example embodiment.

FIG. 3a illustrates a known control strategy for controlling the generator speed $w_g$ of the wind turbine through active pitch control applied to the rotor blades. The desired generator speed $w_{g,ref}$ is illustrated on the y-axis—expressed as rpm—with the incident wind speed illustrated on the x-axis. The scale on the y-axis indicates the percentage of the generator speed reference signal with respect to the rated generator speed value, with a value of 1 indicating 100% of the rated generator speed value. In known fashion, changes in the actual generator speed $w_g$ to bring it into line with the reference value are caused by changing the pitch of the rotor blades to change the torque applied by the rotor to the drive shaft and generator.

The scale on the x-axis begins at the cut-in wind speed, v_in. For wind speeds that are lower than the cut-in wind speed, the generator speed cannot follow the wind speed, and optimal power production relies on controlling the generator rpm to a lower speed limit.

Above the cut-in wind speed, the wind turbine controller 15 gradually ramps up the generator speed reference $w_g$ with increasing wind speed until the maximum rated generator speed is reached (this is indicated by the line reaching a value of '1' in the diagram, indicating the upper speed limit for the generator). In this region, the turbine can be controlled to have an optimum tip speed ratio for the incident wind, and the generator speed follows the wind speed linearly. The wind turbine extracts the maximum power from the wind as the partial load controller provides optimal pitch and power references, but produces a power output that is below the rated power.

The wind speed at which the generator speed reference reaches its maximum permitted value occurs slightly earlier than the rated wind speed. Just before the rated wind speed is reached, the turbine cannot be controlled to optimum speed, because the generator rpm would otherwise become too high. In this region, therefore, efficiency is maintained by operating the turbine at the upper speed limit. The pitch angle is still controlled to the optimal value. The three different regions of operation described above, that is a) below the cut in wind speed, b) above the cut in wind speed up to the upper speed limit of the generator, and c) up to the rated wind speed while maintaining the generator speed at a constant upper limit, are all referred to as partial load operation.

Above the rated wind speed, the controller 15 controls the generator to maintain a constant generator speed and operates in full load. In full load operation, the power reference is kept at the nominal value as the wind speed increases, the controller issues further pitch control signals to the one or more pitch actuators 14 using a collective control algorithm so that more and more wind is spilled from the blades, and the rotational speed of the rotor and generator remain constant at the rated value.

At higher wind speeds, pitch control is no longer sufficient to maintain the rotational speed of the generator within safety margins, as there is a risk of damage to the generator and rotor. The controller begins to derate the generator by issuing commands to operate at a lower rotational speed, thereby reducing the loads and torque experience by the generator and rotor shaft. This is illustrated in FIG. 3a, by the value v_derate, after which the generator speed reference is reduced to zero.

The cut-out wind speed is the speed at which the wind turbine is to be shutdown as further control of the wind turbine cannot be carried out safely. Beyond the cut-out wind speed, v_off, the wind turbine is disconnected from the grid.

Figure 3B:
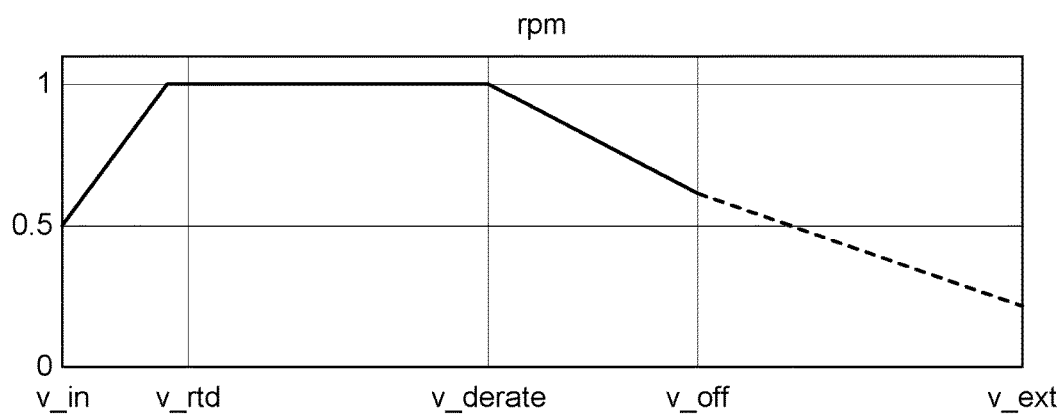

An example embodiment will now be described with respect to FIGS. 3b and 3c. According to an example embodiment of the invention, the generator speed $w_g$ is now actively controlled in a region of operation beyond the cut-out wind speed. Referring to FIG. 3b, it will be seen that the generator wind speed is, as before, gradually decreased once the derate wind speed v_derate is reached. The generator is instead operated at speeds beyond the cut-out wind speed with a non-zero rotational speed.

As will be discussed further, this extended mode of operation assumes that power to operate the wind turbine control systems (the controller 15, one or more pitch actuators, and yaw drive) is available, either from the utility grid, or from an auxiliary source of power, such as a generator, battery storage supply, or the wind turbine itself.

Referring again to FIG. 3b, it can be seen that beyond the cut-out wind speed the controller controls the generator speed to further decreasing with increasing wind speed up to an extended wind speed value of v_ext. At the extended wind speed v_ext, the generator is therefore still actively controlled such that it is rotating with a generator speed, preferably within 15 to 20% of its nominal or rated value, optionally within 10 to 25%. At a wind speed of v_off the generator speed shown in FIG. 3b is controlled to be approximately 60%. In the extended mode of operation, the wind turbine is therefore controlled to idle with a significantly higher generator speed than is usually the case.

Although, FIG. 3b illustrates this extended mode of operation as ending at the extended value of v_ext it will be appreciated that it could be carried on indefinitely. In other words, a cut-out wind speed no longer applies to the control of the generator speed in the control algorithm followed by controller 15. V_ext in the diagram may therefore correspond to a wind speed of 25 m/s, 50 m/s 70 m/s or even higher.

Although, the decrease in generator wind speed is shown as a continuously varying linear function, it will be appreciated that it may in alternative embodiments be varied discontinuously, and in steps or jumps that avoid undesirable generator speeds. For example, some generator speeds will have a frequency that corresponds to the natural frequency, or harmonics of the natural frequency of the wind turbine tower, or to multiples of such frequencies when taking into account the rotation of the individual blades on the rotor. Controlling the generator speed to avoid these values thereby avoids the excitation of the tower and any resulting tower oscillations. Additionally, the controller 15 may also simply maintain the generator speed reference at a constant value, within the range of values given above, without decreasing it further. This situation is illustrated in FIG. 4b, which will be discussed in more detail below.

By actively controlling the rotational speed of the generator speed so that at high wind speeds it has a predetermined value, within a known range of values, it has been found that the loads on the tower and wind turbine blades can be kept within safe margins design for the wind turbine tower. This is counter to the teaching in the art, which brings the rotor to a standstill, or which allows the rotor to idle at very low speeds in an uncontrolled manner purely dependent on the incident wind. The prior art situation has been found undesirable as the turbine and the operational loads cannot in fact be properly controlled. Furthermore, by operating the wind turbine in this way, the loads experienced have been found to be lower than for the standstill case. Thus, assuming that power is available for the wind turbine control systems, this means that the design requirement for building new wind turbines can be updated to assume that the wind turbine will be angled into the wind with active pitch control during storm events.

The control method therefore serves to create an extended controlled mode of operation beyond the cut-out wind speed. In this extended control mode, the controller 15 uses collective pitch control of the wind turbine blades to effect the decrease in generator speed and assumes that the rotor 6 is angled into the wind. As is known in the art, the controller 15 may also use collective pitch control, such as fore-aft tower damping, or cyclical pitch control on individual blades to counter-act any differences in loads experienced by the respective wind turbine blades as they turn in the wind field. Cyclical pitch control may include side to side tower oscillation damping, and main shaft tilt and yaw control for example. At high wind speeds it will be appreciated that the wind field could be very turbulent, and the different loads experienced by the blades could be significant.

At the cut-out wind speed v_off, the controller 15 will electrically disconnect the wind turbine from the grid. In the prior art, this would typically be accompanied by a reduction in the power output of the generator to zero using an appropriate power reference signal. However, in an alternative embodiment, depending on the capability of the power converter, the power may be decreased to a low but non-zero value at the cut_out wind speed, and gradually decreased further beyond the cut-out wind speed in an extended mode of operation. This arrangement is illustrated in FIG. 3c. The power may be supplied to the grid, in which case the wind turbine is controlled so that it remains electrically connected beyond the v_off wind speed. Alternatively, the wind turbine may be electrically disconnected from the grid, and the output power that is produced be diverted to power the electrical systems of the wind turbine generator, so that the wind turbine is self-sustaining.

Referring again to FIG. 3c, as with FIG. 3b, once the cut_in wind speed is exceeded, the controller operates in partial load operation and issues power reference signals to the generator to control the output power fed to the grid. The power reference signal is increased with increasing wind speed until at the rated output power wind speed, the power reference signal is 1 and the power output by the wind turbine is the rated power. Once again at the derate wind speed v_derate, the controller may begin to decrease the output power to zero to avoid electrically overloading the generator or damaging the wind turbine draft shaft. It will be appreciated that at v_ext there will be no need to deliver power to the grid, and due to the extreme conditions, the grid may not be operational.

In the extended mode of operation, the power reference is set to a non-zero value and gradually decreased to zero at v_ext. V_ext in the diagram may therefore correspond to a wind speed of 25 m/s, 50 m/s 70 m/s or higher.

Keeping the power reference above zero in the extended mode of operation means that the turbine can still be operated safely, but that power can still be supplied to the grid if the turbine remains connected. In cases, where the turbine either disconnects from the grid, or where the grid has failed (which is a possibility at high wind speed or extreme wind speed events) the power output by the generator can also serve to supply auxiliary power to the wind turbine for the operation of the controller 15, and the yaw drive 13 and pitch actuators 14.

Figure 3C:
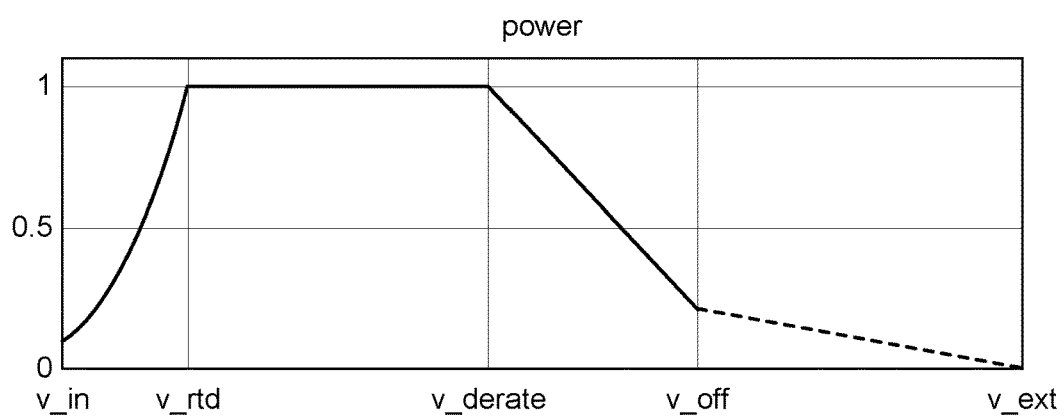

In FIGS. 3*b* and 3*c*, the control of the generator speed and power reference are steadily reduced once the cut off wind speed is reached. In an alternative embodiment illustrated in FIGS. 4*a* and 4*b*, there is a more abrupt change between the normal and extended operating regimes.

Figure 4A:
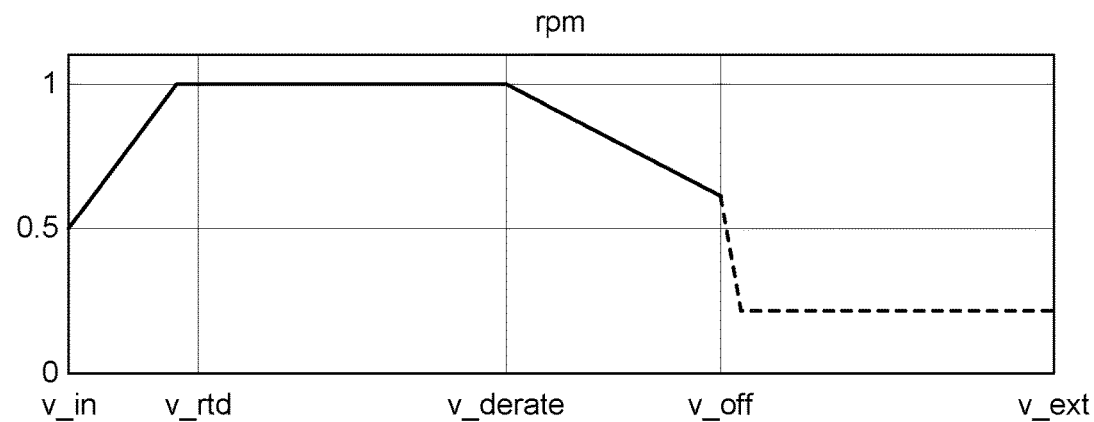
FIG. 4 is a schematic illustration of a generator control algorithm according to a further example embodiment.
Figure 4B:
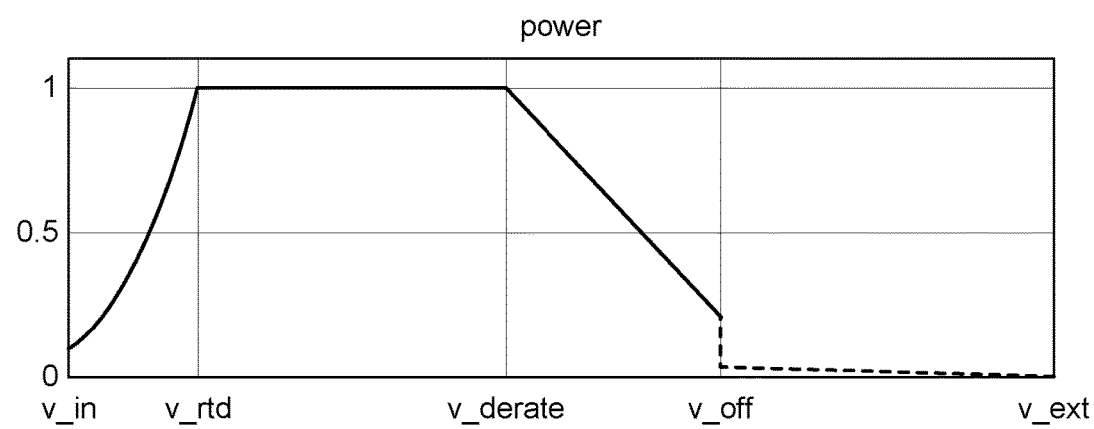

FIG. 4*a* illustrates an alternative embodiment of the invention, where immediately following the cut off wind speed v_off, the generator speed is quickly reduced to a constant value of say 18% of nominal, and held there for increasing wind speeds. Again, the preferred range is between 15% and 20%, optionally between 10% and 25%. In FIG. 4*b*, the power reference is similarly set to zero or to a nominal low value for maintaining auxiliary power functions.

The desirability of maintaining the generator speed in this region can be understood as follows. We have appreciated that it is desirable to maintain the rotor in a rotational state during extreme winds, so that the wind turbine control algorithms, such as pitch control, Tilt Yaw Control and active damping can be used. If the rotor blades are not turning, such control will have no effect on the operation of the rotor. On the other hand, certain generator speeds are known to be problematic. For example, the 3p tower resonance (that is the coincidence between blade passage frequency and tower natural frequency) sets an upper limit for the maximum generator rpm that may be used. It is also known that some loads increase with rpm. The indicated range of generator speeds, therefore allows the rotor to keep turning, with a speed that is high enough for control using the wind turbine control system to be possible and furthermore to have an advantageous effect on wind turbine operation despite the high wind speed. At the same time, the generator speed is low enough not to cause other problems such as additional loading due to the high wind conditions and resonance issues.

It is possible that the extended modes of operation described above operate even if the yaw drive function is not available. For example, if the yaw error, that is the difference between the direction in which the rotor 6 is facing and the incident wind direction is sufficiently low, and pitch control is available, then the teaching of the above control methods can still be applied. If the yaw error becomes too big, then it would be possible to bring the wind turbine to safe standstill as before. A suitable threshold for the yaw error might be 20 degrees for example.

Although the discussion so far has focussed on extreme wind events, the safe idling mode contemplated could also be instigated due to detections of extreme loading events on the wind turbine blades, the rotor bearing hub, or the tower. Extreme loading events may coincide with extreme wind events, and indeed the reason for the extreme loads may be due to a high incident wind speed, wind shear or directional change, or turbulence. Other events may also result in extreme loads being experienced.

Thus, although the discussion of FIGS. 3 and 4 indicate that the safe idling mode is instigated once the wind speed reaches the cut off wind speed, it is not necessary that a measurement of wind speed in fact be made. All that is required is a measurement or detection of an operating condition indicative of an extreme wind condition, or an extreme load. Examples of conditions that may be used to trigger the safe idling mode therefore include, a measure of a high wind speed, wind shear or turbulence, as well as the operational loads experienced by wind turbine component, such as loads on the wind turbine blade, main bearing load, and tilt yaw moments. Once the safe idling mode is activated, the generator and power references are controlled in the manner illustrated in FIGS. 3*b* and 3*c*, or 4*a* and 4*b*.

It will be appreciated that the low idling speed used for the generator, combined with the use of at least pitch control, in the extreme wind or load case, allows the wind turbine to be safely operated, despite conditions that would otherwise require the wind turbine to be shutdown. The safe operation may also be assisted by the use of a number of other wind turbine controllers that further stabilise its operation, such as a Tilt and Yaw controller, an active tower damping controller, and a drive train damping controller. The Tilt and Yaw Controller for example adjusts the individual pitch angle applied to the blades to mitigate tilt and yaw moments on the main bearing shaft of the nacelle. Preferably, the tilt and yaw controller is activated once a yaw error is detected. The Active Tower Damping Controller and the Drive Train Damping Controller similarly apply periodic pitch control signals to the rotor blades to suppress oscillations in the tower or drive train. Other controllers may be possible.

The controllers themselves can be implemented in software or hardware and will typically reside in the main controller 15 of the wind turbine. The controllers are configured to receive inputs from the various sensors described above.

Example embodiments of the invention have been described for the purposes of illustration only, and not to limit the scope of the invention as defined in the following claims.

What is claimed is:

1. A method of operating a wind turbine generator having wind turbine blades with active pitch control, the method comprising:
    determining an operating condition at the wind turbine generator indicative of an extreme wind event or an extreme loading event;
    responsive to the indication of the extreme wind event or the extreme loading event, operating the wind turbine to maintain a generator speed of the wind turbine generator at a non-zero value that is less than its rated value, in a region of wind speeds greater than a predefined cut-out wind speed, wherein the non-zero value is greater than one of a feathered speed and an idle speed when a power output reference of the wind turbine is less than or equal to a nominal low value; and operating one or more blade pitch actuators to control rotation of the wind turbine blades.

2. The method of claim 1, wherein the operating condition is one or more of, the wind speed, the wind direction, a detection of turbulence, a load on a rotor blade, the load on the main bearing, and tilt and yaw moments.

3. The method of claim 1, wherein maintaining the generator speed of the wind turbine generator is performed using one or more of a pitch controller, a tilt and yaw controller, an active tower damping controller, and a drive train damping controller.

4. The method of claim 1, further comprising:
in a second region immediately adjacent the cut-out wind speed, operating one or more blade pitch actuators and maintaining the generator speed at a predetermined value for a given wind speed, the predetermined value for the generator speed decreasing with increasing wind speed.

5. The method of claim 1, further comprising:
electrically disconnecting the wind turbine generator from a utility grid responsive to detecting a wind speed value that is at least the cut-out wind speed.

6. The method of claim 5, further comprising:
in the region,
diverting the power output to provide auxiliary power for one or more wind turbine control systems.

7. The method of claim 1, further comprising:
operating a yaw drive to angle a rotor of the wind turbine generator to face in an oncoming wind direction responsive to the indication of the extreme wind event or the extreme loading event.

8. The method of claim 6, further comprising:
detecting a yaw error; and
responsive to determining that the yaw error is greater than a threshold, setting the generator speed to zero and shutting down the wind turbine generator.

9. A wind turbine generator comprising:
a generator;
one or more wind turbine blades coupled to the generator;
one or more blade pitch actuators for controlling the pitch angle of the one or more wind turbine blades;
one or more sensors for detecting a predefined operating condition of the wind turbine generator; and
a control system comprising one or more controllers for controlling the operation of the generator and the one or more pitch actuators, wherein the control system is operable to:
determine that the operating condition is indicative of an extreme wind event or an extreme loading event;
responsive to the indication of the extreme wind event or the extreme loading event, maintain a generator speed of the generator at a non-zero value that is less than a rated value, in a region of wind speeds greater than a predefined cut-out wind speed, the non-zero value greater than one of a feathered speed and an idle speed, wherein in the region an output power reference of the wind turbine is set to less than or equal to a nominal low value; and
operate the one or more blade pitch actuators to control rotation of the one or more wind turbine blades.

10. A computer program product comprising a non-transitory computer-readable medium having code which, when executed on a processor, causes the processor to perform an operation comprising:
determining an operating condition at a wind turbine generator indicative of an extreme wind event or an extreme loading event;
responsive to the indication of the extreme wind event or the extreme loading event, maintaining a generator speed of the wind turbine generator at a non-zero value that is less than a rated value, the non-zero value greater than one of a feathered speed and an idle speed, in a region of wind speeds greater than a predefined cut-out wind speed, where an output power reference of the wind turbine is set to less than or equal to a nominal low value; and
operating one or more blade pitch actuators to control rotation of the wind turbine blades.

11. The method of claim 1, wherein the generator speed is controlled to decrease discontinuously at least once corresponding to a predefined wind speed.

12. The method of claim 1, wherein the non-zero value is greater than 10% of a rated speed of the generator.

13. The method of claim 12, wherein the non-zero value of the generator speed is between 15% and 20% of the rated speed of the generator.

14. The method of claim 1, wherein the predefined cut-out wind speed is greater than 25 meters per second (m/s).

15. The method of claim 14, wherein the predefined cut-out wind speed is equal to or greater than 50 m/s.

16. The method according to claim 1, further comprising:
maintaining in the region, auxiliary power functions from the power output.

17. The method according to claim 11, wherein the at least one discontinuous decrease corresponds to one or more of: a natural frequency of a tower of the wind turbine, or one or more harmonics of the natural frequency.

18. The method according to claim 1, wherein the extreme loading event is an extreme wind condition having a high incident speed.

19. The method according to claim 16, wherein the nominal low value is a speed sufficient to produce the energy for maintaining the auxiliary power functions.

* * * * *